United States Patent
Imamura et al.

(10) Patent No.: US 8,803,455 B2
(45) Date of Patent: Aug. 12, 2014

(54) MOTOR CONTROLLING APPARATUS AND ELECTRIC POWER STEERING APPARATUS USING THE SAME

(75) Inventors: Yousuke Imamura, Gunma (JP); Masahiro Maeda, Gunma (JP); Kenichi Shimada, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/202,430

(22) PCT Filed: Jul. 26, 2011

(86) PCT No.: PCT/JP2011/066895
§ 371 (c)(1),
(2), (4) Date: Oct. 11, 2011

(87) PCT Pub. No.: WO2012/093503
PCT Pub. Date: Jul. 12, 2012

(65) Prior Publication Data
US 2013/0271047 A1    Oct. 17, 2013

(30) Foreign Application Priority Data

Jan. 5, 2011   (JP) .................................. 2011-000571

(51) Int. Cl.
*H02K 5/00*           (2006.01)
(52) U.S. Cl.
USPC .................... 318/400.2; 318/400.17; 318/430
(58) Field of Classification Search
None
See application file for complete search history.

(56) References Cited

U.S. PATENT DOCUMENTS 4,871,952 A * 10/1989 Ishizaka et al. ............... 388/829
6,731,094 B1 * 5/2004 Itoh et al. ...................... 318/727
2003/0155878 A1 * 8/2003 Murai ............................ 318/268
2007/0107973 A1 * 5/2007 Jiang et al. .................... 180/443
2008/0079377 A1 * 4/2008 Williams et al. .......... 318/400.17
2009/0284194 A1 * 11/2009 Forte ........................ 318/400.02

FOREIGN PATENT DOCUMENTS

| JP | 2005-531270 A | 10/2005 |
| JP | 3931079 B2 | 6/2007 |
| JP | 2007166730 A | 6/2007 |
| JP | 2009247171 A | 10/2009 |

OTHER PUBLICATIONS

International Search Report for PCT/JP2011/066895; Oct. 25, 2011.

* cited by examiner

*Primary Examiner* — Paul Ip
*Assistant Examiner* — Joseph Devon
(74) *Attorney, Agent, or Firm* — Sughrue Mion, PLLC

(57) ABSTRACT

[Problem]
An object of the present invention is to provide a motor controlling apparatus that comprises a single current sensor and obtains a maximal duty range that current becomes detectable with realizing size reduction, weight saving and cost reduction and an electric power steering apparatus using the same.
[Means for solving the problem]
A motor controlling apparatus that calculates each phase duty command value for controlling a motor current by means of control calculation, forms PWM waveforms corresponding to each phase duty command value and drives the motor based on the PWM waveforms by an inverter, comprising: a duty shift function that uniformly either increases or decreases each phase duty command value with keeping differences in each phase duty command value; and a PWM output position changing function that decides output positions of each phase PWM signal, and wherein a single current detector is connected to power supply input side or power supply output side of the inverter, timing that a PWM signal of only one phase becomes ON state or PWM signals of two phases become ON state simultaneously is generated at fixed positions of PWM periods, and the motor current is detected.

4 Claims, 8 Drawing Sheets

PRIOR ART

PRIOR ART

PRIOR ART

PRIOR ART

MOTOR CONTROLLING APPARATUS AND ELECTRIC POWER STEERING APPARATUS USING THE SAME

CROSS REFERENCE TO RELATED APPLICATIONS

This application is a National Stage of International Application No. PCT/JP2011/066895 filed on Jul. 26, 2011, which claims priority from Japanese Patent Application No. 2011-000571, filed on Jan. 5, 2011, the contents of all of which are incorporated herein by reference in their entirety.

TECHNICAL FIELD

The present invention relates to a motor controlling apparatus that calculates each phase duty command value for controlling a motor current by means of control calculation, forms PWM waveforms corresponding to each phase duty command value, provides a motor with command currents (voltages) by a PWM controlling inverter and drives the motor, and an electric power steering apparatus that provides a steering mechanism of a vehicle with an assist torque generated by the motor by using the motor controlling apparatus, and in particular to a motor controlling apparatus that comprises a duty shift function that uniformly either increases or decreases each phase duty command value with keeping differences in each phase duty command value (i.e. each phase duty difference) and a PWM output position changing function that performs changing output positions of each phase PWM signal along with arranging a single current detector (a single current sensor) at power supply input side or power supply output side (earth side) of the PWM controlling inverter and performing PWM control, and obtains a maximal duty range that current becomes detectable with realizing size reduction, weight saving and cost reduction by generating timing that a PWM signal of only one phase becomes ON state or PWM signals of two phases become ON state simultaneously (i.e. PWM signal ON state timing) at fixed positions of PWM periods and detecting the motor current, and an electric power steering apparatus using the same.

BACKGROUND ART

An electric power steering apparatus which provides a steering apparatus of an automobile or a vehicle with a steering assist torque (an assist torque) by means of a rotational torque of a motor, applies a driving force of the motor as the assist torque to a steering shaft or a rack shaft by means of a transmission mechanism such as gears or a belt through a reduction mechanism. In order to accurately generate the assist torque (the steering assist torque), such a conventional electric power steering apparatus performs a feedback control of a motor current. The feedback control adjusts a voltage supplied to the motor so that a difference between a current command value and a detected value of the motor current becomes small, and the adjustment of the voltage applied to the motor is generally performed by an adjustment of a duty ratio of a PWM (Pulse Width Modulation) control.

A general configuration of such an electric power steering apparatus will be described with reference to FIG. 1. A column shaft 2 connected to a steering wheel 1 is connected to tie rods 6 of steered wheels through reduction gears 3, universal joints 4a and 4b, and a rack and pinion mechanism 5. The column shaft 2 is provided with a torque sensor 10 for detecting the steering torque of the steering wheel 1, and a motor 20 for assisting the steering force of the steering wheel 1 is connected to the column shaft 2 through the reduction gears 3. Electric power is supplied to a control unit 30 for controlling the electric power steering apparatus from a battery 13, and an ignition key signal is inputted into the control unit 30 through an ignition key 11. The control unit 30 calculates a motor current Im of an assist command based on a steering torque T detected by the torque sensor 10 and a velocity V detected by a velocity sensor 12, and calculated motor current Im is supplied to the motor 20.

The control unit 30 mainly comprises a CPU (or an MPU or an MCU), and general functions performed by a program within the CPU are shown in FIG. 2.

The functions and operations of the control unit 30 will be described with reference to FIG. 2. The steering torque T detected by the torque sensor 10 is phase-compensated by a phase compensating section 31 and then inputted to a steering assist command value calculating section 32, and the velocity V detected by the velocity sensor 12 is also inputted to the steering assist command value calculating section 32. Based on the inputted steering torque T and velocity V, the steering assist command value calculating section 32 decides a steering assist command value I that is a control desired value of the current supplied to the motor 20 with reference to an assist map. The steering assist command value I is inputted to a subtracting section 30A and a differential compensating section 34 that is a feed-forward system for enhancing the response speed. A deviation (I-i) of the subtracting section 30A is inputted to a proportional calculating section 35 and an integral calculating section 36 that is used to improve characteristics of the feedback system. The output of the proportional calculating section 35 is inputted to an adding section 30B. The outputs of the differential compensating section 34 and the integral calculating section 36 are also inputted to the adding section 30B. A current control value E that is an addition result obtained by the adding section 30B, is inputted to a motor driving circuit 37 as a motor driving signal. Electric power is supplied to the motor driving circuit 37 from the battery 13 through the ignition key 11 and a fuse 33. A motor current value i of the motor 20 is detected by a motor current detecting circuit 38, and then the motor current value i is inputted to the subtracting section 30A to be fed back.

A general configuration example of the motor driving circuit 37 will be described with reference to FIG. 3. The motor driving circuit 37 comprises a PWM control section 37A and an inverter 37B. The PWM control section 37A comprises a duty calculating section 371 that calculates duty command values D1~D6 of PWM signals of three phases according to a given expression based on the current control value E and a gate driving section 372 that drives gates of FETs as switching elements based on the duty command values D1~D6 of the PWM signals and simultaneously switches on/off after performing a dead time compensation. The inverter 37B comprises a three-phase bridge of FETs and drives the motor 20 by being switched on/off based on the duty command values D1~D6 of the PWM signals.

In such a motor driving apparatus, in the case of driving a multi-phase brushless motor by an inverter, it is necessary to figure out the rotor position (i.e. phases of the motor) and then sequentially switch the energized status to each phase according to phases of the motor. Motor driving apparatuses that the rotor position (i.e. the phases of the motor) is/are generally detected by a rotor position sensor such as hall elements or a resolver and switching of the inverter (FETs) is performed according to the detected rotor position, are put into practical use. Further, a motor driving apparatus that relational expressions between current value flowing in each coil of the motor and phases of the motor are known, the current value of each coil phase is measured and the phases of the motor are detected based on these current values, is proposed.

For the configuration of the current feedback system and the motor position calculation as described above, it is necessary to measure the current value of each coil phase. On the other hand, size reduction and weight saving of an electric power steering apparatus, and unification of current detectors (i.e. current sensors) as one item of cost reduction, are requested.

A configuration example of an inverter connected to a single current detector will be described with reference to FIG. 4. In this configuration example, a motor 50 having three phases (A-phase, B-phase and C-phase), is PWM-controlled by 6 FETs of a bridge configuration, electric power is supplied to high-side FETs from a power supply (a battery) 51, and a single current detector 60 is connected to power supply output side (earth side) of the bridge configuration. In this case, the current flowing in the current detector 60, that is, the detected motor current, varies depending on ON/OFF state of each FET. As an example, FIG. 5 shows a current path in the case that high-side FET of A-phase is in ON state (low-side FET of A-phase is in OFF state), and high-side FETs of B-phase and C-phase are in OFF state (low-side FETs of B-phase and C-phase are in ON state). Further, FIG. 6 shows a current path in the case that high-side FETs of A-phase and B-phase are in ON state (low-side FETs of A-phase and B-phase are in OFF state), and high-side FET of C-phase is in OFF state (low-side FET of C-phase is in ON state). From FIG. 5 and FIG. 6, it is clear that a sum of phase currents of phases that their high-side FETs are in ON state, appears in the current detector 60 as a current. In the case that the current detector 60 is connected to power supply input side of the inverter, this is similar.

Based on the above-described thing, it is clear that the detection of phase currents of three phases becomes possible by detecting the current by using the current detector 60 in the case that one phase is in ON state and two phases are in ON state and then utilizing a characteristic that a sum of phase currents of three phases is zero. In the case of FIG. 5, current $I_A$ of A-phase is detected by the current detector 60. Further, in the case of FIG. 6, a sum of current $I_A$ of A-phase and current $I_B$ of B-phase is detected by the current detector 60. Since there is a relationship that $I_A+I_B+I_C=0$, current $I_C$ of C-phase can be detected based on $I_C=-(I_A+I_B)$. That is to say, even depending on the current detection by using the single current detector 60, by utilizing the characteristic that a sum of phase currents of three phases is zero, it is possible to detect phase current of each phase.

THE LIST OF PRIOR ART DOCUMENTS

Patent Documents

Patent Document 1: Japanese Patent Application (Translation of PCT Application) Laid-open No. 2005-531270
Patent Document 2: Japanese Patent No. 3931079

SUMMARY OF THE INVENTION

Problems to be Solved by the Invention

However, in the inverter comprised of a single current detector as shown in FIG. 4, in order to accurately detect the current while removing noise components such as rigging noises caused by that the current flows in the current detector 60 shortly after ON state of each FET, a certain amount of detection time is necessary. For this reason, in order to detect the current in the case that one phase is in ON state and two phases are in ON state, although it is necessary to keep only necessary time for current detection, in the case that each phase duty command value reaches equilibrium, that is, in the case that each phase duty is similar, there is a problem that it is impossible to ensure that necessary time. In order to solve this problem, for example, there are prior art documents described in Patent Document 1 and Patent Document 2.

In Patent Document 1, "a motor driving apparatus with a single current sensor using space vector technique" is disclosed. The configuration of the motor driving apparatus disclosed in Patent Document 1 is a constitution that PWM patterns (PWM signals) that one phase becomes ON state and two phases become ON state only during necessary time for current detection are decided based on a magnitude relation of each phase duty command value and the space vector technique, and then decided PWM patterns (decided PWM signals) are outputted.

However, in Patent Document 1, in order to actually output PWM patterns based on the space vector technique, it is necessary to use a microcomputer that responds to the space vector and is capable of setting ON/OFF of PWM signals at arbitrary positions of PWM periods, it is impossible to use a general PWM timer with carriers, and furthermore since it is necessary to vary current detection timing, the current detection is not easy.

On the other hand, in Patent Document 2, "a motor driving apparatus and a refrigeration apparatus using the same" is disclosed. The configuration of the motor driving apparatus disclosed in Patent Document 2 is a constitution that duty command values are corrected so as to ensure time that one phase becomes ON state and two phases become ON state only during necessary time for current detection, and increased or decreased amount due to the correction is adjusted in the next carrier period so that the average value becomes equal to the original duty command value. In this way, in the apparatus disclosed in Patent Document 2, since a thing that one phase becomes ON state and two phases become ON state is realized by duty changing for every PWM period, it is possible to realize the thing even by a general PWM timer with carriers.

However, in Patent Document 2, since duty command values are changed and changed amount is corrected in the next carrier period, due to duty changing within two PWM periods, the motor current produce a vibration, as a result, there is a high possibility of causing worsening of torque ripple performances and operation sound performances, it is necessary to vary the current detection timing, and the current detection is not easy.

The present invention has been developed in view of the above described circumstances, and an object of the present invention is to provide a motor controlling apparatus that is capable of solving the above-described conventional problems, obtains a maximal duty range that current becomes detectable with realizing size reduction, weight saving and cost reduction, and is comprised of a single current sensor, and an electric power steering apparatus using the same.

Means for Solving the Problems

The present invention relates to a motor controlling apparatus that calculates each phase duty command value for controlling a motor current by means of control calculation, forms PWM waveforms corresponding to said each phase duty command value and drives said motor based on said PWM waveforms by an inverter, the above-described object of the present invention is achieved by that comprising: a duty shift function that uniformly either increases or decreases said each phase duty command value with keeping differences in said each phase duty command value; and a PWM output position changing function that decides output positions of each phase PWM signal, and wherein a single current detector is connected to power supply input side or power supply output side of said inverter, timing that a PWM signal of only one phase becomes ON state or PWM signals of two phases become ON state simultaneously is generated at fixed positions of PWM periods, and said motor current is detected.

Further, the above-described object of the present invention is more effectively achieved by that said PWM output position changing function changes PWM signal output reference points that become output starting positions of PWM signals of a maximum duty phase, a middle duty phase and a minimum duty phase depending on a magnitude relation of said each phase duty command value; or by that said PWM output position changing function selects said PWM signal output reference point from any one of a starting point of said PWM period, a center of said PWM period and an ending point of said PWM period; or by that said duty shift function changes duty shift amounts depending on said magnitude relation of said each phase duty command value; or by that in the case that said each phase duty command value reaches equilibrium, a maximum duty phase, a middle duty phase and a minimum duty phase are set as an arbitrary phase.

Effects of the Invention

Since a motor controlling apparatus according to the present invention comprises a duty shift function that uniformly either increases or decreases each phase duty command value with keeping differences in each phase duty command value and a PWM output position changing function that performs changing output positions of each phase PWM signal along with arranging a single current detector (for example, one shunt resistance) at power supply input side or power supply output side (earth side) of the PWM controlling inverter and performing PWM control, generates timing that a PWM signal of only one phase becomes ON state or PWM signals of two phases become ON state simultaneously (i.e. current detection timing) at fixed positions of PWM periods, and detects each phase current of the motor, according to the present invention, it is possible to obtain a maximal duty range that current becomes detectable with realizing size reduction, weight saving and cost reduction.

Since the present invention selects an output starting position of a PWM signal from any one of a starting point of a PWM period, a center of a PWM period and an ending point of a PWM period, for example, by using a general-purpose microcomputer timer configuration with triangular wave carriers, easy realization becomes possible.

Further, since the present invention changes each phase duty command value with keeping each phase duty difference, there is no influence on the motor current due to duty command value changing, and it is possible to suppress the degradation of torque ripple performances and operation sound performances. Moreover, since the present invention generates timing that a PWM signal of only one phase becomes ON state or PWM signals of two phases become ON state simultaneously (the current detection timing) at fixed positions of PWM periods by combining the duty shift function and the PWM output position changing function, configuration of current detection A/D mechanism becomes easy.

Furthermore, in the case that each phase duty command value reaches equilibrium, since the present invention utilizes a constitution that sets a maximum duty phase, a middle duty phase and a minimum duty phase to an arbitrary phase, it is possible to avoid hunting of output positions of PWM signals and the degradation of torque ripple performances and operation sound performances.

MODE FOR CARRYING OUT THE INVENTION

Figure 1:
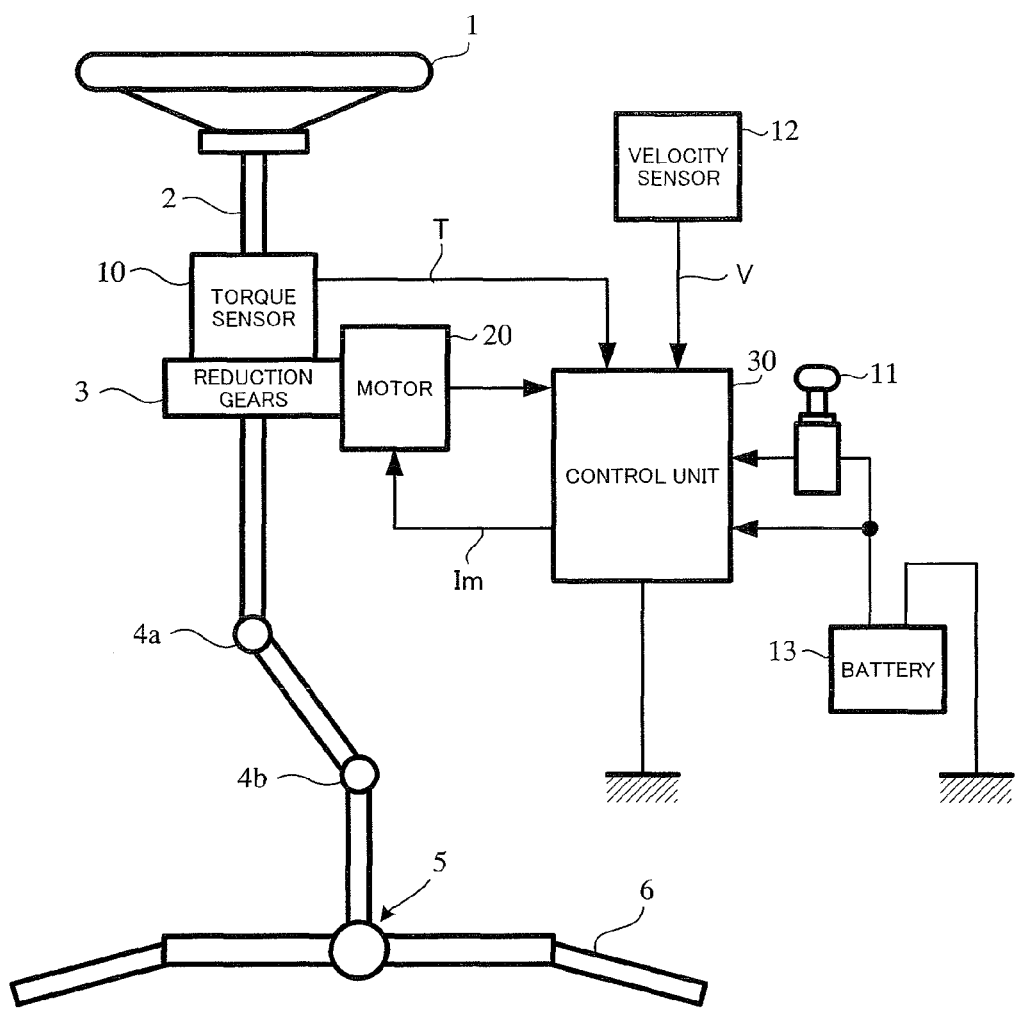
FIG. 1 is a diagram showing a configuration example of a general electric power steering apparatus.
Figure 2:
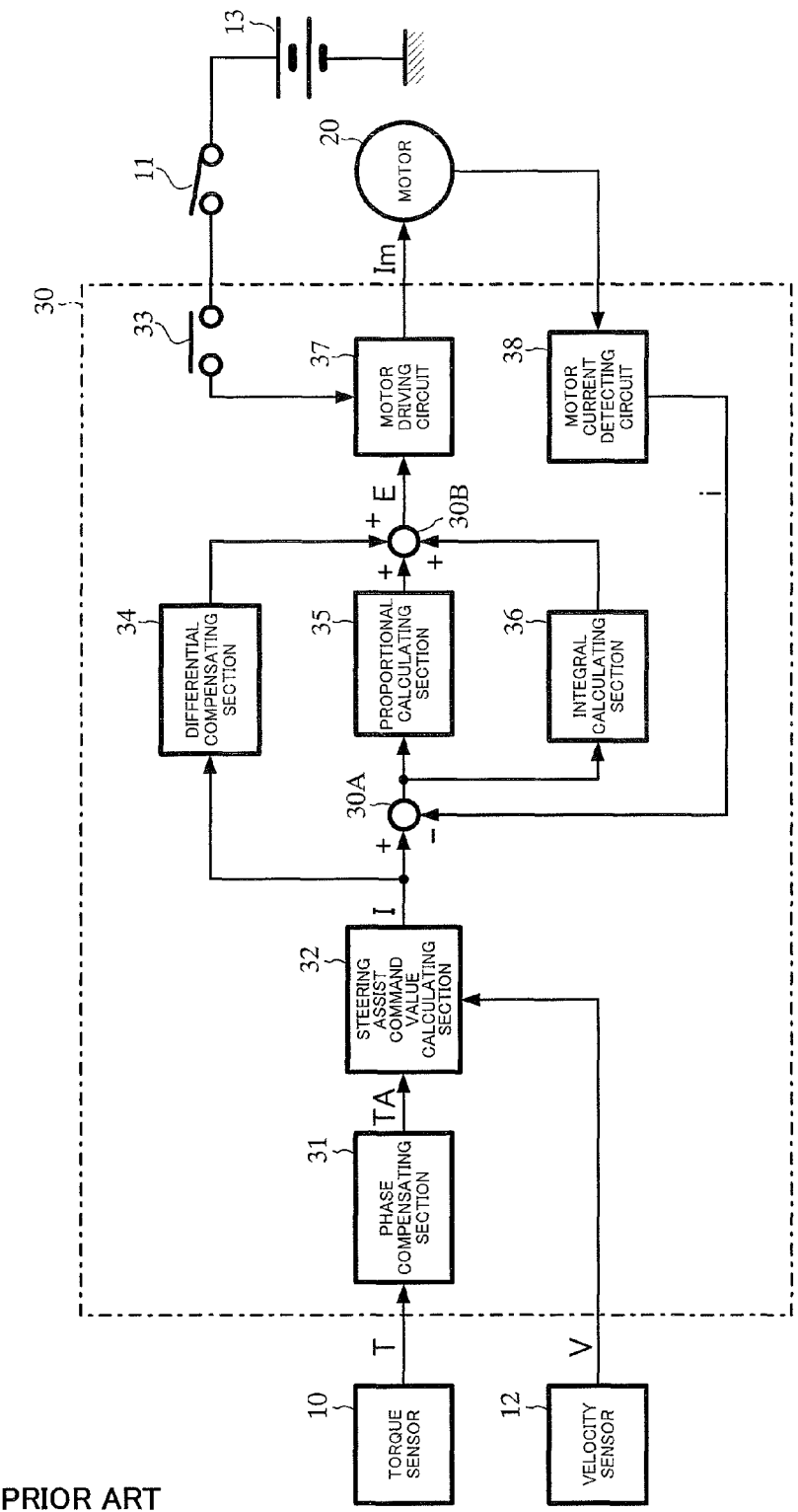
FIG. 2 is a block diagram showing a configuration example of a control unit of a conventional electric power steering apparatus.
Figure 3:
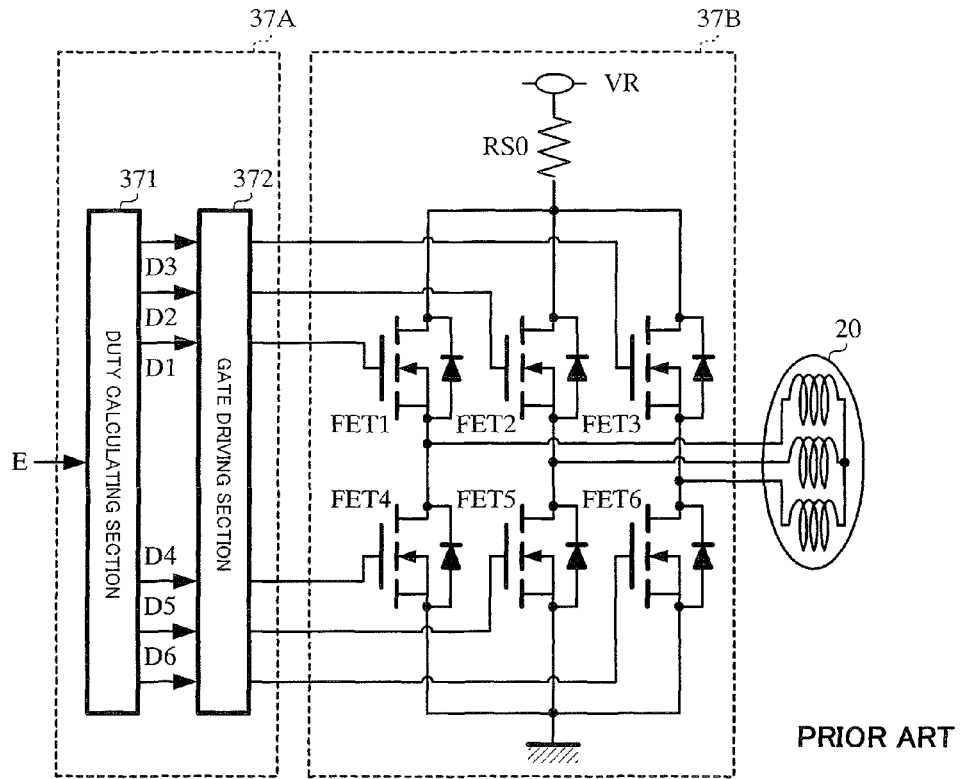
FIG. 3 is a wiring diagram showing an example of a motor driving circuit of a three-phase motor.
Figure 4:
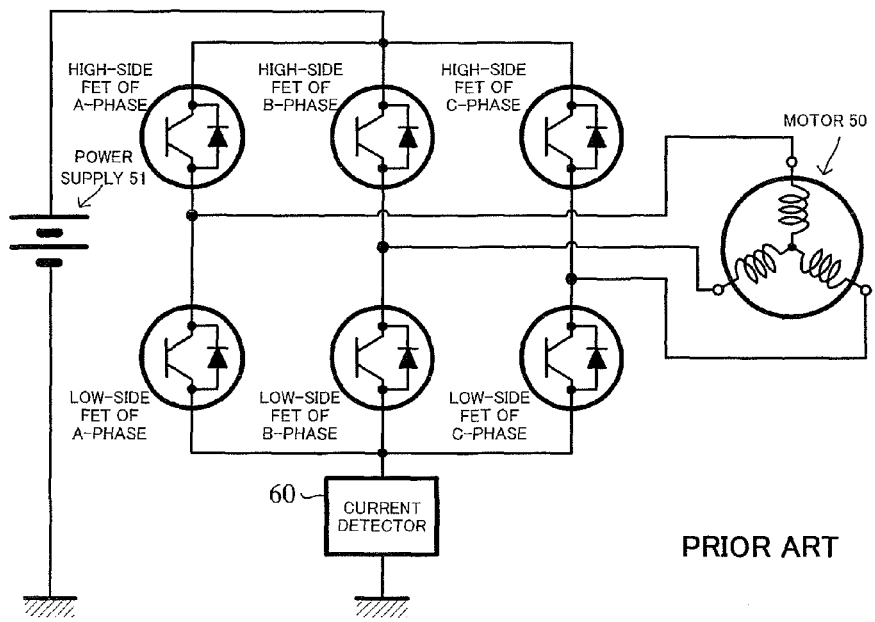
FIG. 4 is a wiring diagram showing a configuration example of an inverter using a single current detector.
Figure 5:
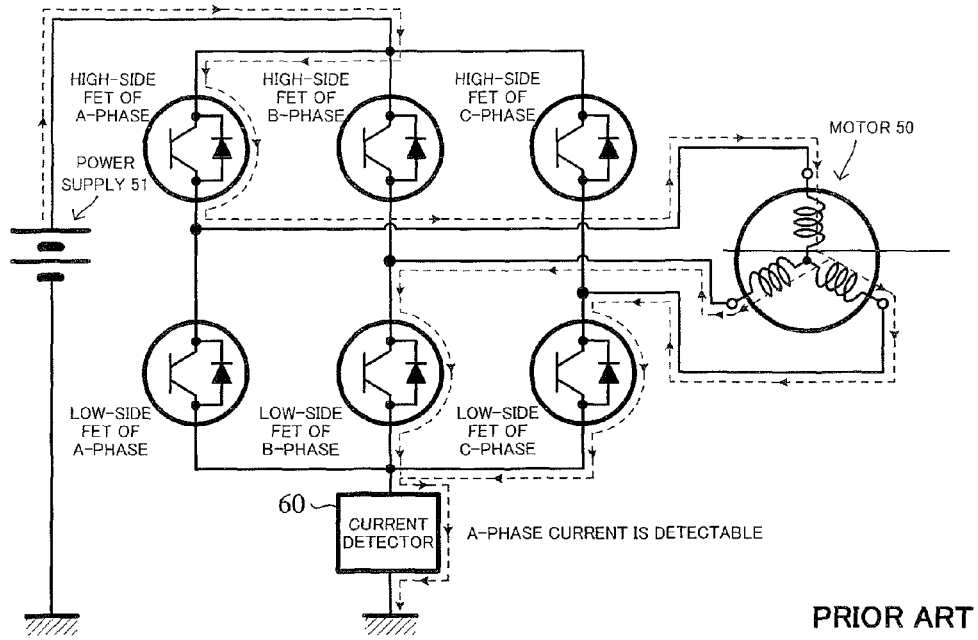
FIG. 5 is a diagram for illustrating one operation example (A-phase is in ON state) of the inverter shown in FIG. 4.
Figure 6:
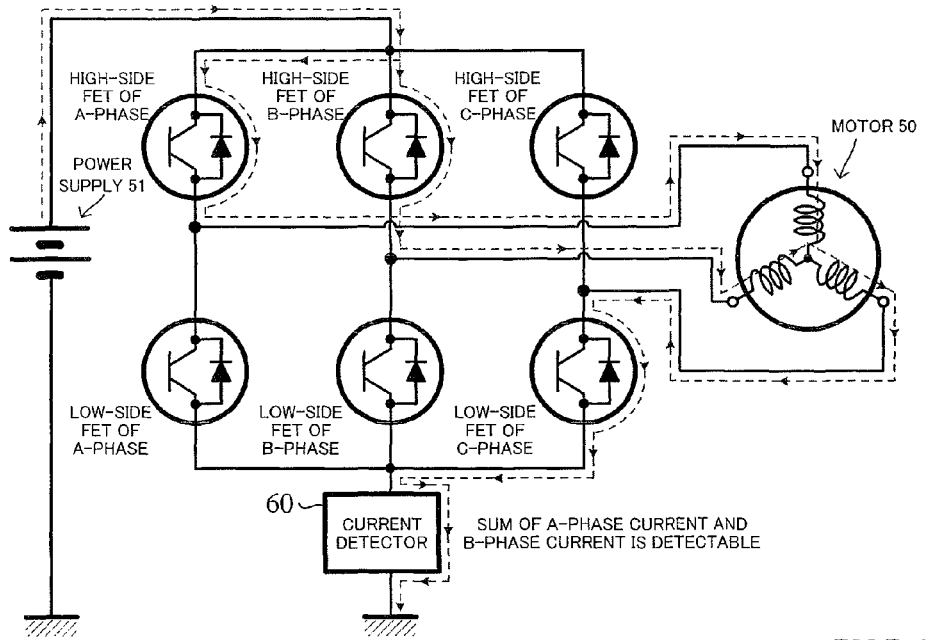
FIG. 6 is a diagram for illustrating another operation example (A-phase and B-phase are in ON state) of the inverter shown in FIG. 4.

The present invention relates to a motor controlling apparatus that comprises a single current sensor (a single current detector), calculates each phase duty command value for controlling a motor current by means of control calculation, forms PWM waveforms (PWM signals) corresponding to the each phase duty command value, provides a motor with command currents (voltages) by a PWM controlling inverter and drives the motor, and an electric power steering apparatus that provides a steering mechanism of a vehicle with an assist torque generated by the motor by using the motor controlling apparatus.

In the motor controlling apparatus according to the present invention, by comprising a duty shift function that uniformly either increases or decreases each phase duty command value with keeping differences in each phase duty command value (i.e. each phase duty difference) and a PWM output position changing function that performs changing output positions (an output starting position and an output ending position) of each phase PWM signal along with arranging the single current detector (the single current sensor) at power supply input side or power supply output side (earth side) of the PWM controlling inverter and performing PWM control, generating timing that a PWM signal of only one phase becomes ON state or PWM signals of two phases become ON state simultaneously (i.e. PWM signal ON state timing) at fixed positions of PWM periods and detecting the motor current, it is possible to obtain a maximal duty range that current becomes detectable with realizing size reduction, weight saving and cost reduction.

In the motor controlling apparatus according to the present invention, by comprising the duty shift function (a duty shift section) that changes each phase duty command value with keeping duty differences between phases (each phase duty difference) by either increasing or decreasing the same value (hereinafter referred to as "a duty shift amount") with respect to each phase duty command value and the PWM output position changing function (a PWM output position changing section) that performs changing the output starting position and the output ending position of each phase PWM signal, and performing processes in the duty shift section and the PWM output position changing section, it is possible to generate PWM signals that are capable of performing the current detection at fixed positions of PWM periods (i.e. at fixed current detection positions). Hereinafter, a fixed current detection position is also simply referred to as "a fixed current detection timing".

In the present invention, in order to decide the duty shift amount, and the output starting position and the output ending position of the PWM signal, it is necessary to determine the magnitude of duty based on duty command values of three phases.

In other words, in the present invention, since output positions of the PWM signal (the output starting position and the output ending position of the PWM signal) and the duty shift amount are changed (decided) depending on a magnitude relation of duty command values of three phases, according to the present invention, it becomes possible to obtain a maximal duty range that current becomes detectable.

In the present invention, a maximum duty command value in each phase duty command value is set as a maximum duty value, a middle duty command value in each phase duty command value is set as a middle duty value, and a minimum duty command value in each phase duty command value is set as a minimum duty value. Further, a phase having the maximum duty value is set as a maximum duty phase, a phase having the middle duty value is set as a middle duty phase, and a phase having the minimum duty value is set as a minimum duty phase.

The motor controlling apparatus according to the present invention comprises a duty determining function (a duty determining section) that determines the maximum duty value, the middle duty value, the minimum duty value, the maximum duty phase, the middle duty phase, and the minimum duty phase based on the magnitude relation of each phase duty command value.

Moreover, in the duty determining section, in the case of determining that each phase duty command value reaches equilibrium, the determination of the maximum duty phase, the middle duty phase and the minimum duty phase is not performed, and the maximum duty phase, the middle duty phase and the minimum duty phase are set as an arbitrary phase.

In the present invention, the PWM output position changing section selects the output starting position of the PWM signal of each duty phase (the maximum duty phase, the middle duty phase and the minimum duty phase) determined by the duty determining section from any one of the starting point of the PWM period, the center of the PWM period and the ending point of the PWM period. Hereinafter, an output starting position of a PWM signal is also simply referred to as "a PWM signal output reference point".

In the present invention, since the output starting position of the PWM signal is selected from any one of the starting point of the PWM period, the center of the PWM period and the ending point of the PWM period, for example, by using a general-purpose microcomputer timer configuration with triangular wave carriers, easy realization becomes possible.

Further, since the present invention changes each phase duty command value with keeping duty differences between phases (each phase duty difference), there is no influence on the motor current due to duty command value changing, and it is possible to suppress the degradation of torque ripple performances and operation sound performances. Moreover, since the present invention generates timing that a PWM signal of only one phase becomes ON state or PWM signals of two phases become ON state simultaneously (the current detection timing) at fixed positions of PWM periods by combining the duty shift function and the PWM output position changing function, configuration of current detection A/D mechanism becomes easy.

Furthermore, in the case that each phase duty command value reaches equilibrium, there is a possibility that determining the magnitude of the duty command value causes hunting of the output position of the PWM signal, since the output position of the PWM signal is frequently changed due to this possibility, there is a problem to cause the degradation of operation sound performances. However, in the present invention, in the case that each phase duty command value reaches equilibrium, since the constitution that sets the maximum duty phase, the middle duty phase and the minimum duty phase to an arbitrary phase is utilized, it becomes possible to avoid the hunting of the output position of the PWM signal and the degradation of torque ripple performances and operation sound performances, and it is possible to avoid this problem.

Hereinafter, a preferred embodiment of the present invention will be described in detail with reference to the drawings.

Figure 7:
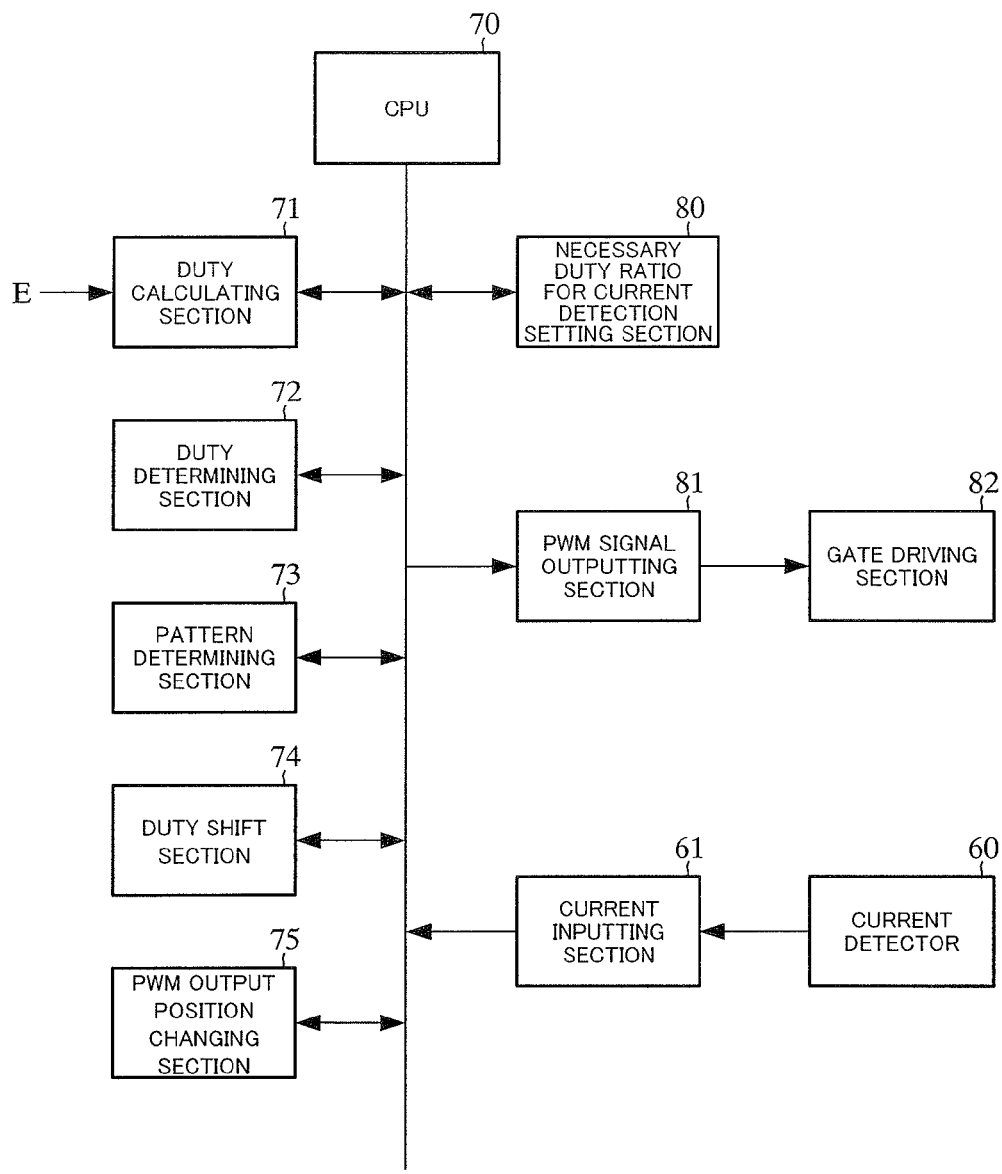
FIG. 7 is a block diagram showing a configuration example of an apparatus that realizes overall control of a motor controlling apparatus according to the present invention and various functions comprising a duty shift function and a PWM output position changing function.
Figure 8:
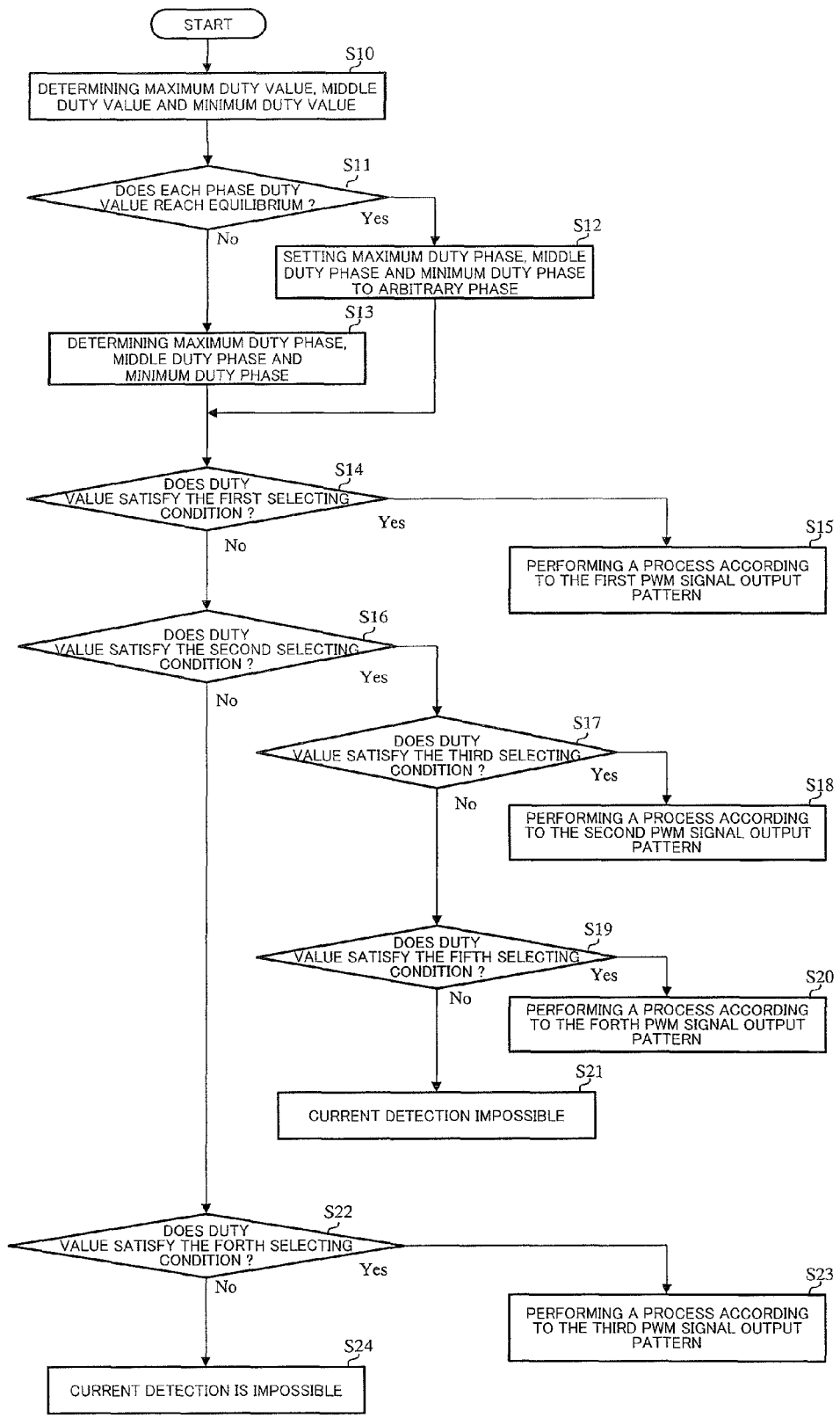
FIG. 8 is a flowchart showing a working example of the apparatus shown in FIG. 7.

FIG. 7 is a block diagram showing a configuration example of an apparatus that realizes overall control of a motor controlling apparatus according to the present invention and various functions comprising a duty shift function and a PWM output position changing function. Further, FIG. 8 is a flowchart showing a working example of the apparatus shown in FIG. 7. Furthermore, in the following description, a duty ratio corresponding to the necessary time for current detection, that is, a necessary duty ratio for current detection that is for ensuring the necessary time for current detection, is set as τ%.

As shown in FIG. 7, the apparatus of FIG. 7 comprises a CPU 70 that performs overall control of the motor controlling apparatus, calculation processing and so on, and a duty calculating section 71, a duty determining section 72, a pattern determining section 73, a duty shift section 74 and a PWM output position changing section 75 are connected to the CPU 70.

The duty calculating section 71 inputs the current control value E and calculates each phase duty command value.

The duty determining section 72 determines the maximum duty value, the middle duty value, the minimum duty value, the maximum duty phase, the middle duty phase, and the minimum duty phase based on each phase duty command value that is calculated by the duty calculating section 71.

The pattern determining section 73 determines PWM signal output patterns according to given selecting conditions based on the maximum duty value, the middle duty value, the minimum duty value, the maximum duty phase, the middle duty phase, and the minimum duty phase that are determined by the duty determining section 72.

The duty shift section 74 determines the duty shift amount based on the PWM signal output pattern determined by the pattern determining section 73, and changes (shifts) each phase duty command value based on the determined duty shift amount.

The PWM output position changing section 75 performs changing of the output starting position and the output ending position of each phase PWM signal based on each phase duty command value changed by the duty shift section 74 (hereinafter, also simply referred to as "each phase duty command value after shift") and the PWM signal output pattern determined by the pattern determining section 73, and generates the output pattern of each phase PWM signal.

Furthermore, a necessary duty ratio for current detection setting section 80, a PWM signal outputting section 81 and a current inputting section 61 are connected to the CPU 70.

The necessary duty ratio for current detection setting section 80 sets the necessary duty ratio for current detection (τ%) as a parameter.

The PWM signal outputting section 81 outputs each phase PWM signal based on output patterns of each phase PWM signal that are generated by processes according to the first PWM signal output pattern~the fourth PWM signal output pattern described below, to a gate driving section 82.

The current inputting section 61 inputs the current detected by a current detector 60.

In such a configuration, when operations start, the duty calculating section 71 calculates each phase duty command value based on the inputted current control value E, and the duty determining section 72 firstly determines the maximum duty value, the middle duty value and the minimum duty value (step S10).

In the duty determining section 72, in the case of determining that each phase duty command value reaches equilibrium based on determined the maximum duty value, the middle duty value and the minimum duty value (step S11), the determination of the maximum duty phase, the middle duty phase and the minimum duty phase is not performed, and the maximum duty phase, the middle duty phase and the minimum duty phase are set as an arbitrary phase (step S12), in the case of determining that each phase duty command value does not reach equilibrium (step S11), the determination of the maximum duty phase, the middle duty phase and the minimum duty phase is performed (step S13).

Next, the pattern determining section 73 determines PWM signal output patterns according to the given selecting conditions based on the maximum duty value, the middle duty value, the minimum duty value, the maximum duty phase, the middle duty phase, and the minimum duty phase that are determined by the duty determining section 72.

Concretely, the pattern determining section 73 judges whether each phase duty command value satisfies the first selecting condition or not (step S14), in the case of judging that the duty command value satisfied the first selecting condition, the pattern determining section 73 performs a process according to the first PWM signal output pattern (step S15), in the case of judging that the duty command value does not satisfy the first selecting condition, the pattern determining section 73 judges whether each phase duty command value satisfies the second selecting condition or not (step S16).

In the case of judging that the duty command value satisfied the second selecting condition, the pattern determining section 73 judges whether each phase duty command value satisfies the third selecting condition or not (step S17), in the case of judging that the duty command value does not satisfy the second selecting condition, the pattern determining section 73 judges whether each phase duty command value satisfies the fourth selecting condition or not (step S22).

In the case of judging that the duty command value satisfied the third selecting condition, the pattern determining section 73 performs a process according to the second PWM signal output pattern (step S18), in the case of judging that the duty command value does not satisfy the third selecting condition, the pattern determining section 73 judges whether each phase duty command value satisfies the fifth selecting condition or not (step S19).

In the case of judging that the duty command value satisfied the fifth selecting condition, the pattern determining section 73 performs a process according to the fourth PWM signal output pattern (step S20), in the case of judging that the duty command value does not satisfy the fifth selecting condition, the pattern determining section 73 determines that current detection becomes impossible (step S21).

In the case of judging that the duty command value satisfied the fourth selecting condition, the pattern determining section 73 performs a process according to the third PWM signal output pattern (step S23), in the case of judging that the duty command value does not satisfy the fourth selecting condition, the pattern determining section 73 determines that current detection becomes impossible (step S24).

Here, the first selecting condition~the fifth selecting condition and the first PWM signal output pattern~the fourth PWM signal output pattern will be described in detail. In the present invention, depending on the magnitude relation of the determined duty command values of three phases, and based on the given selecting conditions (the first selecting condition~the fifth selecting condition), the processes according to the first PWM signal output pattern~the fourth PWM signal output pattern (a duty shift process and a PWM signal output position changing process) are performed. Moreover, in the following description, the current detection timing (a current detection A/D timing) is set as the following two positions.

The first current detection position (the first current detection timing) is a position where the necessary time for current detection (τ%) elapsed from the starting point of the PWM period. Further, the second current detection position (the second current detection timing) is the center of the PWM period.

<The First PWM Signal Output Pattern>

In the second PWM signal output pattern, the third PWM signal output pattern and the fourth PWM signal output pattern described below, each phase PWM output position is changed depending on the magnitude of each phase duty value, however, in the case that each phase duty command value reaches equilibrium, since the determination of the maximum duty phase, the middle duty phase and the minimum duty phase causes hunting, there is a possibility that PWM output positions frequently switch and operation sound performances degrade. For this reason, in the present invention, as described above, in the case that each phase duty command value reaches equilibrium, the determination of the maximum duty phase, the middle duty phase and the minimum duty phase is not performed, and the maximum duty phase, the middle duty phase and the minimum duty phase are set as an arbitrary phase, that is, each phase PWM output position is fixed.

The first selecting condition is set as "the maximum duty value−the minimum duty value≤50%−2×τ%" so that the maximum duty value after the duty shift process is equal to or lower than 50%−τ%.

That is to say, in the motor controlling apparatus according to the present invention, in the case that "the maximum duty value−the minimum duty value≤50%−2×τ%" holds, it is judged that the duty command value satisfied the first selecting condition, and then the process according to the first PWM signal output pattern is performed. On the other hand, in the case that "the maximum duty value−the minimum duty value≤50%−2×τ%" does not hold, it is judged that the duty command value does not satisfy the first selecting condition, and then the motor controlling apparatus according to the present invention judges whether each phase duty command value satisfies the second selecting condition or not.

The process according to the first PWM signal output pattern comprises a first duty shift process that changes each phase duty command value based on a first duty shift amount, and a first PWM output position changing process that performs changing of the output starting position and the output ending position of each phase PWM signal.

The first duty shift process shifts each phase command value based on the first duty shift amount (the minimum duty value+τ%) so that a minimum value among three-phase duty command values after the duty shift process becomes τ%. Since a minimum duty value after the first duty shift process is τ%, it becomes possible to ensure the necessary time for current detection (τ%).

By performing the first duty shift process, relations represented by the following expressions hold.

*A*-phase duty value after the first duty shift process=*A*-phase duty value−the minimum duty value+τ%

*B*-phase duty value after the first duty shift process=*B*-phase duty value−the minimum duty value+τ%

*C*-phase duty value after the first duty shift process=*C*-phase duty value−the minimum duty value+τ%

Figure 9:
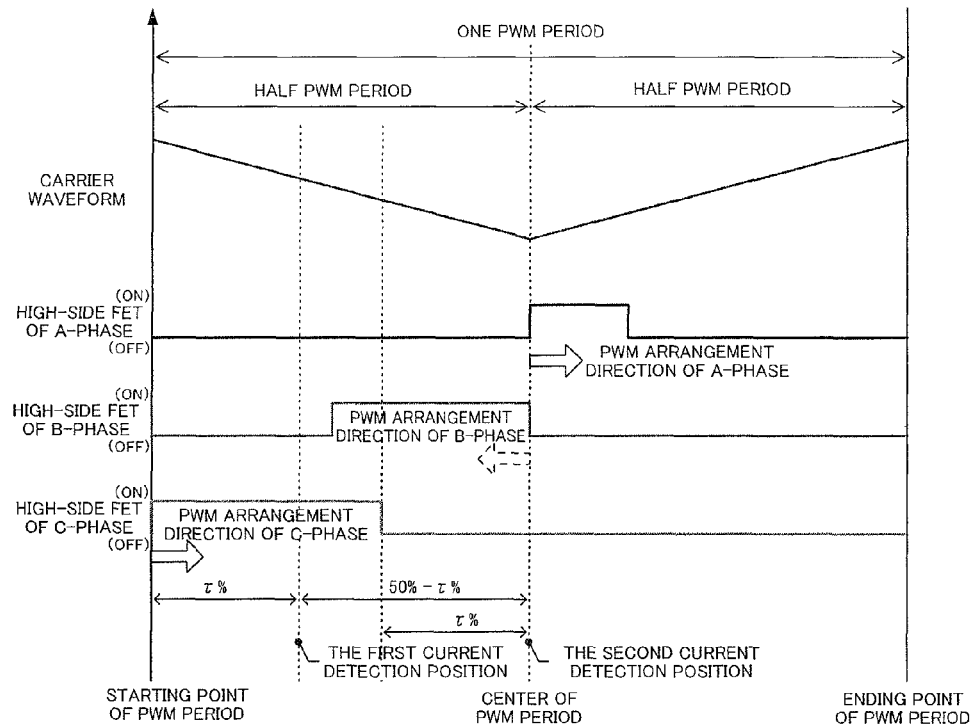
FIG. 9 is a waveform diagram showing an arranging example of PWM signals (triangular wave carriers) in the case of the first PWM signal output pattern according to the present invention.

The first PWM output position changing process will be described with reference to FIG. 9. In the first PWM output position changing process, the output starting position and the output ending position of each phase PWM signal are decided as below.

A-phase PWM signal is arranged in a direction toward the ending point of the PWM period after setting the center of the PWM period as the PWM signal output reference point (the output starting position of the PWM signal). Further, B-phase PWM signal is arranged in a direction toward the starting point of the PWM period after setting the center of the PWM period as the PWM signal output reference point (the output starting position of the PWM signal). Outputting of B-phase PWM signal is completed by the center of the PWM period. And then, C-phase PWM signal is arranged in the direction toward the ending point of the PWM period after setting the starting point of the PWM period as the PWM signal output reference point (the output starting position of the PWM signal).

By performing PWM signal output described above, at the first current detection position, C-phase current becomes detectable, and at the second current detection position, B-phase current becomes detectable.

Moreover, in the first PWM output position changing process, the relation between the output position of the PWM signal and the phase is not limited to the relation as described above, for example, it is possible that A-phase PWM signal is arranged in the direction toward the ending point of the PWM period after setting the starting point of the PWM period as the PWM signal output reference point, B-phase PWM signal is arranged in the direction toward the ending point of the PWM period after setting the center of the PWM period as the PWM signal output reference point, and C-phase PWM signal is arranged in the direction toward the starting point of the PWM period after setting the center of the PWM period as the PWM signal output reference point (outputting of C-phase PWM signal is completed by the center of the PWM period). In this case, at the first current detection position, A-phase current becomes detectable, and at the second current detection position, C-phase current becomes detectable.

<The Second PWM Signal Output Pattern>

As described above, the motor controlling apparatus according to the present invention, judges that the duty command value does not satisfy the first selecting condition, and then judges whether each phase duty command value satisfies the second selecting condition or not. In the case of judging that the duty command value satisfied the second selecting condition, the motor controlling apparatus according to the present invention judges whether each phase duty command value satisfies the third selecting condition or not. In the case of judging that the duty command value satisfied the third selecting condition, the process according to the second PWM signal output pattern is performed. In order to generate a status that only one phase is in ON state and a status that two phases are in ON state simultaneously at fixed current detection timing, the second selecting condition is that the middle duty value is equal to or lower than 100%−τ%. Further, the third selecting condition is that the middle duty value is equal to or more than τ%.

The process according to the second PWM signal output pattern comprises only a second PWM output position changing process that performs changing of the output starting position and the output ending position of each phase PWM signal depending on the magnitude of each phase duty command value, and generates the status that only one phase is in ON state and the status that two phases are in ON state simultaneously at the fixed current detection timing. Further, in the process according to the second PWM signal output pattern, the duty shift process is not performed.

Figure 10:
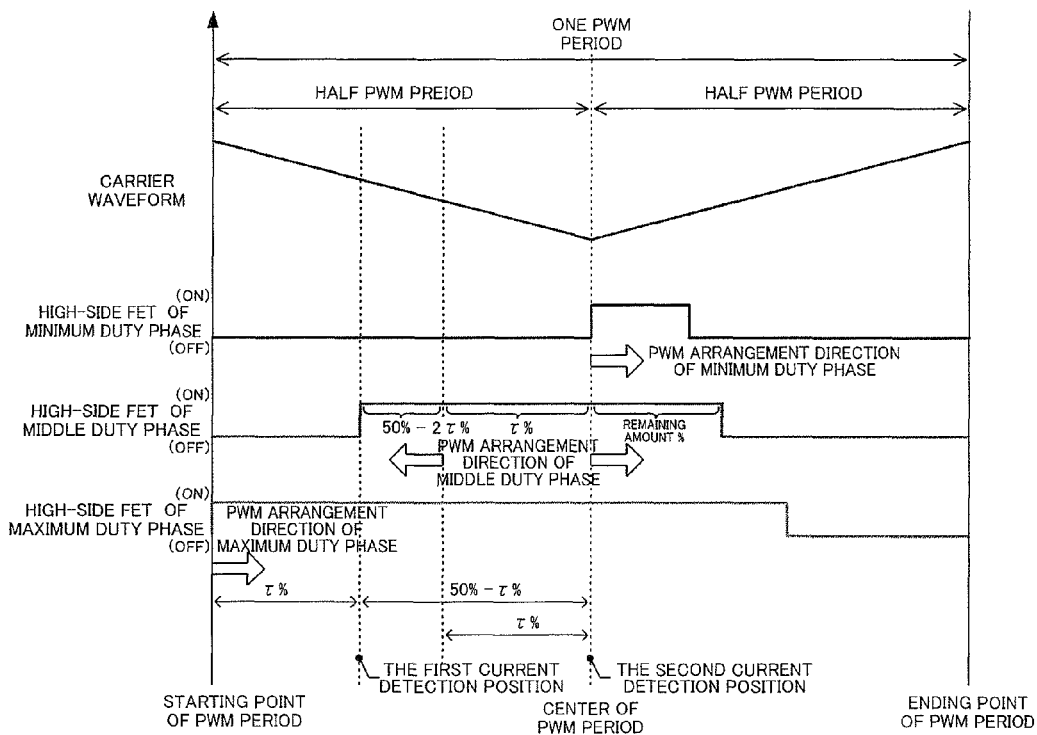
FIG. 10 is a waveform diagram showing an arranging example of PWM signals (triangular wave carriers) in the case of the second PWM signal output pattern according to the present invention.

The second PWM output position changing process will be described with reference to FIG. 10. In the second PWM output position changing process, the output starting position and the output ending position of each phase PWM signal are decided as below.

The PWM signal of the minimum duty phase is arranged in the direction toward the ending point of the PWM period after setting the center of the PWM period as the PWM signal output reference point (the output starting position of the PWM signal). Further, after setting the center of the PWM period as the PWM signal output reference point (the output starting position of the PWM signal), the PWM signal of the middle duty phase is outputted from the PWM signal output reference point by including a position to −τ%. In the case that the middle duty phase exceeds τ%, the PWM signal of the middle duty phase is arranged in the direction toward the starting point of the PWM period after setting the center of the PWM period as the PWM signal output reference point, and the amount beyond 50%−τ% is arranged so as to be outputted from the center of the PWM period to the direction toward the ending point of the PWM period. And then, the PWM signal of the maximum duty phase is arranged in the direction toward the ending point of the PWM period after setting the starting point of the PWM period as the PWM signal output reference point (the output starting position of the PWM signal).

By performing PWM signal output described above, at the first current detection position, the current of the maximum duty phase becomes detectable, and at the second current detection position, a sum of the current of the maximum duty phase and the current of the middle duty phase (that is, a value obtained by inverting the sign of the minimum duty phase) becomes detectable.

<The Third PWM Signal Output Pattern>

As described above, in the case of judging that the duty command value does not satisfy the second selecting condition, the motor controlling apparatus according to the present invention judges whether each phase duty command value satisfies the fourth selecting condition or not. In the case of judging that the duty command value satisfied the fourth selecting condition, the process according to the third PWM signal output pattern is performed. In the case of judging that the duty command value does not satisfy the fourth selecting condition, the motor controlling apparatus according to the present invention determines that the current detection becomes impossible.

The fourth selecting condition is set as "the middle duty value−the minimum duty value≤100%−τ%" so that the middle duty value after the duty shift process is equal to or lower than 100%−τ%.

That is to say, in the motor controlling apparatus according to the present invention, in the case that "the middle duty value−the minimum duty value 100%−τ%" holds, it is judged that the duty command value satisfied the fourth selecting condition, and then the process according to the third PWM signal output pattern is performed. On the other hand, in the case that "the middle duty value−the minimum duty value≤100%−τ%" does not hold, it is judged that the duty command value does not satisfy the fourth selecting condition, and then the motor controlling apparatus according to the present invention determines that the current detection becomes impossible.

That is to say, the third PWM signal output pattern is selected in a situation that since the middle duty value exceeds 100%−τ%, at the first current detection position, it is impossible to ensure the status that only one phase is in ON state during the necessary time for current detection (τ%).

The process according to the third PWM signal output pattern comprises a third duty shift process that changes each phase duty command value based on a third duty shift amount, and a third PWM output position changing process that performs changing of the output starting position and the output ending position of each phase PWM signal. By reducing as much as possible the middle duty value with keeping each phase duty difference by performing the third duty shift process, a duty range that current becomes detectable is broadened.

The third duty shift process shifts each phase command value based on the third duty shift amount (the minimum duty value) so that the minimum value among three-phase duty command values after the duty shift process becomes 0%.

By performing the third duty shift process, relations represented by the following expressions hold.

Figure 11:
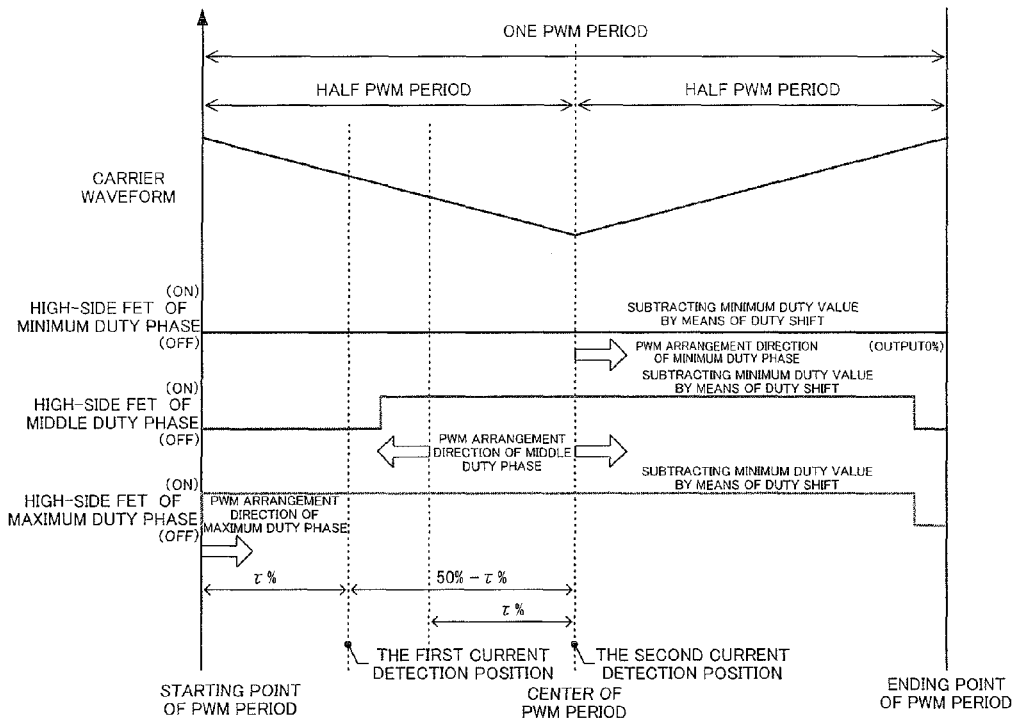
FIG. 11 is a waveform diagram showing an arranging example of PWM signals (triangular wave carriers) in the case of the third PWM signal output pattern according to the present invention.

$A$-phase duty value after the third duty shift process=$A$-phase duty value−the minimum duty value $B$-phase duty value after the third duty shift process=$B$-phase duty value−the minimum duty value $C$-phase duty value after the third duty shift process=$C$-phase duty value−the minimum duty value The third PWM output position changing process will be described with reference to FIG. 11. In the third PWM output position changing process, the output starting position and the output ending position of each phase PWM signal are decided as below.

The PWM signal of the minimum duty phase is arranged in the direction toward the ending point of the PWM period after setting the center of the PWM period as the PWM signal output reference point (the output starting position of the PWM signal). Further, after setting the center of the PWM period as the PWM signal output reference point (the output starting position of the PWM signal), the PWM signal of the middle duty phase is outputted from the PWM signal output reference point by including a position to −τ%. In the case that the middle duty phase exceeds τ%, the PWM signal of the middle duty phase is arranged in the direction toward the starting point of the PWM period after setting the center of the PWM period as the PWM signal output reference point, and the amount beyond 50%−τ% is arranged so as to be outputted from the center of the PWM period to the direction toward the ending point of the PWM period. And then, the PWM signal of the maximum duty phase is arranged in the direction toward the ending point of the PWM period after setting the starting point of the PWM period as the PWM signal output reference point (the output starting position of the PWM signal).

By performing PWM signal output described above, at the first current detection position, the current of the maximum duty phase becomes detectable, and at the second current detection position, a sum of the current of the maximum duty phase and the current of the middle duty phase (that is, a value obtained by inverting the sign of the minimum duty phase) becomes detectable.

<The Fourth PWM Signal Output Pattern>

As described above, in the case of judging that the duty command value does not satisfy the third selecting condition, the motor controlling apparatus according to the present invention judges whether each phase duty command value satisfies the fifth selecting condition or not. In the case of judging that the duty command value satisfied the fifth selecting condition, the process according to the fourth PWM signal output pattern is performed. In the case of judging that the duty command value does not satisfy the fifth selecting condition, the motor controlling apparatus according to the present invention determines that the current detection becomes impossible.

The fifth selecting condition is set as "the maximum duty value−the middle duty value≤100%−τ%" so that the middle duty value after the duty shift process is equal to or more than τ%.

That is to say, in the motor controlling apparatus according to the present invention, in the case that "the maximum duty value−the middle duty value≤100%−τ%" holds, it is judged that the duty command value satisfied the fifth selecting condition, and then the process according to the fourth PWM signal output pattern is performed. On the other hand, in the case that "the maximum duty value−the middle duty value≤100%−τ%" does not hold, it is judged that the duty command value does not satisfy the fifth selecting condition, and then the motor controlling apparatus according to the present invention determines that the current detection becomes impossible.

That is to say, the fourth PWM signal output pattern is selected in a situation that since the middle duty value is less than τ%, at the second current detection position, it is impossible to ensure the status that two phases are in ON state simultaneously during the necessary time for current detection (τ%).

The process according to the fourth PWM signal output pattern comprises a fourth duty shift process that changes each phase duty command value based on a fourth duty shift amount, and a fourth PWM output position changing process that performs changing of the output starting position and the output ending position of each phase PWM signal. By enlarging as much as possible the middle duty value with keeping each phase duty difference by performing the fourth duty shift process, a duty range that current becomes detectable is broadened.

The fourth duty shift process shifts each phase command value based on the fourth duty shift amount (the maximum duty value+100%) so that a maximum value among three-phase duty command values after the duty shift process becomes 100%.

By performing the fourth duty shift process, relations represented by the following expressions hold.

$A$-phase duty value after the fourth duty shift process=$A$-phase duty value−the maximum duty value+100%

$B$-phase duty value after the fourth duty shift process=$B$-phase duty value−the maximum duty value+100%

$C$-phase duty value after the fourth duty shift process=$C$-phase duty value−the maximum duty value+100%

Figure 12:
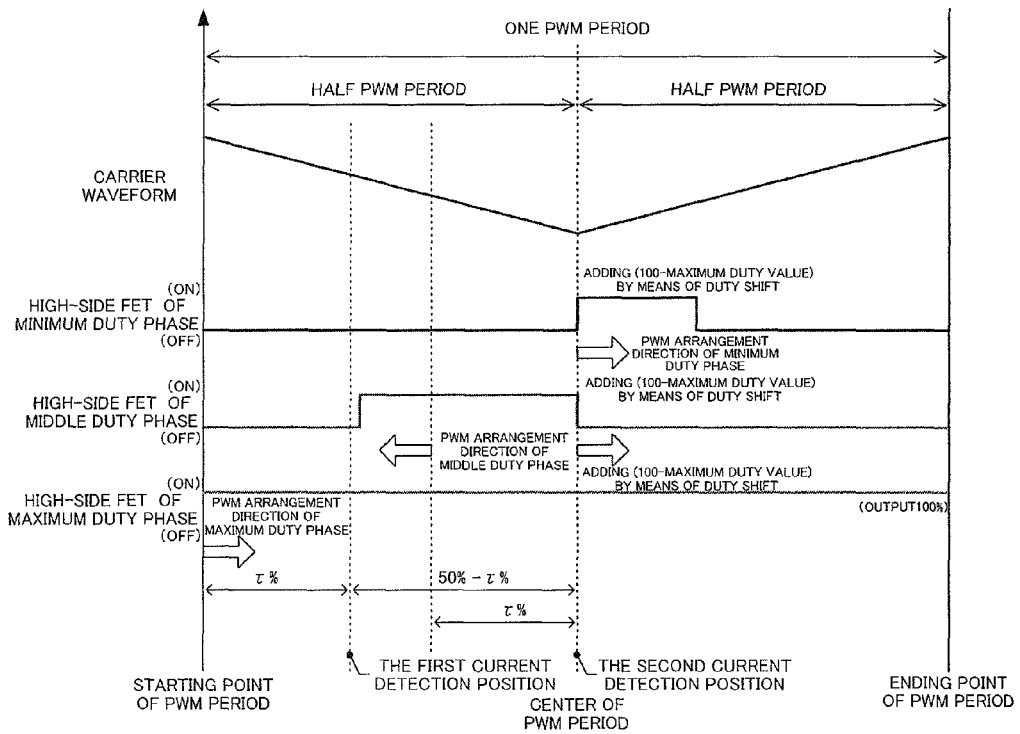
FIG. 12 is a waveform diagram showing an arranging example of PWM signals (triangular wave carriers) in the case of the fourth PWM signal output pattern according to the present invention.

The fourth PWM output position changing process will be described with reference to FIG. 12. In the fourth PWM output position changing process, the output starting position and the output ending position of each phase PWM signal are decided as below.

The PWM signal of the minimum duty phase is arranged in the direction toward the ending point of the PWM period after setting the center of the PWM period as the PWM signal output reference point (the output starting position of the PWM signal). Further, after setting the center of the PWM period as the PWM signal output reference point (the output starting position of the PWM signal), the PWM signal of the middle duty phase is outputted from the PWM signal output reference point by including a position to −τ%. In the case that the middle duty phase exceeds τ%, the PWM signal of the middle duty phase is arranged in the direction toward the starting point of the PWM period after setting the center of the PWM period as the PWM signal output reference point, and the amount beyond 50%−τ% is arranged so as to be outputted from the center of the PWM period to the direction toward the ending point of the PWM period. And then, the PWM signal of the maximum duty phase is arranged in the direction toward the ending point of the PWM period after setting the starting point of the PWM period as the PWM signal output reference point (the output starting position of the PWM signal).

By performing PWM signal output described above, at the first current detection position, the current of the maximum duty phase becomes detectable, and at the second current detection position, a sum of the current of the maximum duty phase and the current of the middle duty phase (that is, a value obtained by inverting the sign of the minimum duty phase) becomes detectable.

By performing the processes according to four PWM signal output patterns (the first PWM signal output pattern~the fourth PWM signal output pattern) described above, the motor controlling apparatus according to the present invention made it possible to perform the current detection based on a single current detector in a wide duty range.

The first duty shift process, the second duty shift process, the third duty shift process and the fourth duty shift process are performed in the duty shift section 74. Further, the first PWM output position changing process, the second PWM output position changing process, the third PWM output position changing process and the fourth PWM output position changing process are performed in the PWM output position changing section 75.

Moreover, in the above-described embodiment, although the current detection timing is twice set in the first half of the PWM period, that is, the first current detection position that is the position where the necessary time for current detection (τ%) elapsed from the starting point of the PWM period and the second current detection position that is the center of the PWM period, the present invention is not limited to this. For example, it is possible to set twice the current detection timing in the last half of the PWM period, in this case, it can be arranged that the output starting position of the PWM signal of each PWM signal output pattern is mirror-reversed from the center of the PWM period.

Further, in the above-described embodiment, it is not necessary that A-phase in the first PWM signal output pattern or the minimum duty phase in the second PWM signal output pattern~the fourth PWM signal output pattern becomes ON state at the current detection timing, for example, it is possible to set the ending point of the PWM period as the PWM signal output reference point and arrange the PWM signal in a direction toward the center of the PWM period.

EXPLANATION OF REFERENCE NUMERALS 1 steering wheel
2 column shaft
3 reduction gears
10 torque sensor
12 velocity sensor
20 motor
30 control unit
37 motor driving circuit
50 three-phase motor
51 power supply (battery)
60 current detector
61 current inputting section
70 CPU
71 duty calculating section
72 duty determining section
73 pattern determining section
74 duty shift section
75 PWM output position changing section
80 necessary duty ratio for current detection setting section
81 PWM signal outputting section
82 gate driving section

| Explanation of Reference Numerals | |
|---|---|
| 1 | steering wheel |
| 2 | column shaft |
| 3 | reduction gears |
| 10 | torque sensor |
| 12 | velocity sensor |
| 20 | motor |
| 30 | control unit |
| 37 | motor driving circuit |

-continued

| Explanation of Reference Numerals | |
|---|---|
| 50 | three-phase motor |
| 51 | power supply (battery) |
| 60 | current detector |
| 61 | current inputting section |
| 70 | CPU |
| 71 | duty calculating section |
| 72 | duty determining section |
| 73 | pattern determining section |
| 74 | duty shift section |
| 75 | PWM output position changing section |
| 80 | necessary duty ratio for current detection setting section |
| 81 | PWM signal outputting section |
| 82 | gate driving section |

The invention claimed is:

1. A motor controlling apparatus that calculates each phase duty command value for controlling a motor current by means of control calculation, forms PWM waveforms corresponding to said each phase duty command value and drives said motor based on said PWM waveforms by an inverter, comprising:
   a duty shift function that uniformly either increases or decreases said each phase duty command value with keeping differences in said each phase duty command value; and
   a PWM output position changing function that decides output positions of each phase PWM signal, and
   wherein a single current detector is connected to power supply input side or power supply output side of said inverter,
   timing that a PWM signal of only one phase becomes ON state or PWM signals of two phases become ON state simultaneously is generated at fixed positions of PWM periods, and said motor current is detected,
   wherein said PWM output position changing function changes PWM signal output reference points that become output starting positions of PWM signals of a maximum duty phase, a middle duty phase and a minimum duty phase depending on a magnitude relation of said each phase duty command value,
   wherein said PWM output position changing function selects said PWM signal output reference point from any one of a starting point of said PWM period, a center of said PWM period and an ending point of said PWM period.

2. A motor controlling apparatus according to claim 1, wherein said duty shift function changes duty shift amounts depending on said magnitude relation of said each phase duty command value.

3. A motor controlling apparatus according to claim 2, wherein the case that said each phase duty command value reaches equilibrium, said maximum duty phase, said middle duty phase and said minimum duty phase are set as an arbitrary phase.

4. An electric power steering apparatus comprising a motor controlling apparatus according to claim 1.

* * * * *